April 22, 1930.  H. J. KLINE  1,755,182
HYDRAULIC CLUTCH TRANSMISSION
Filed Aug. 14, 1928   5 Sheets-Sheet 1
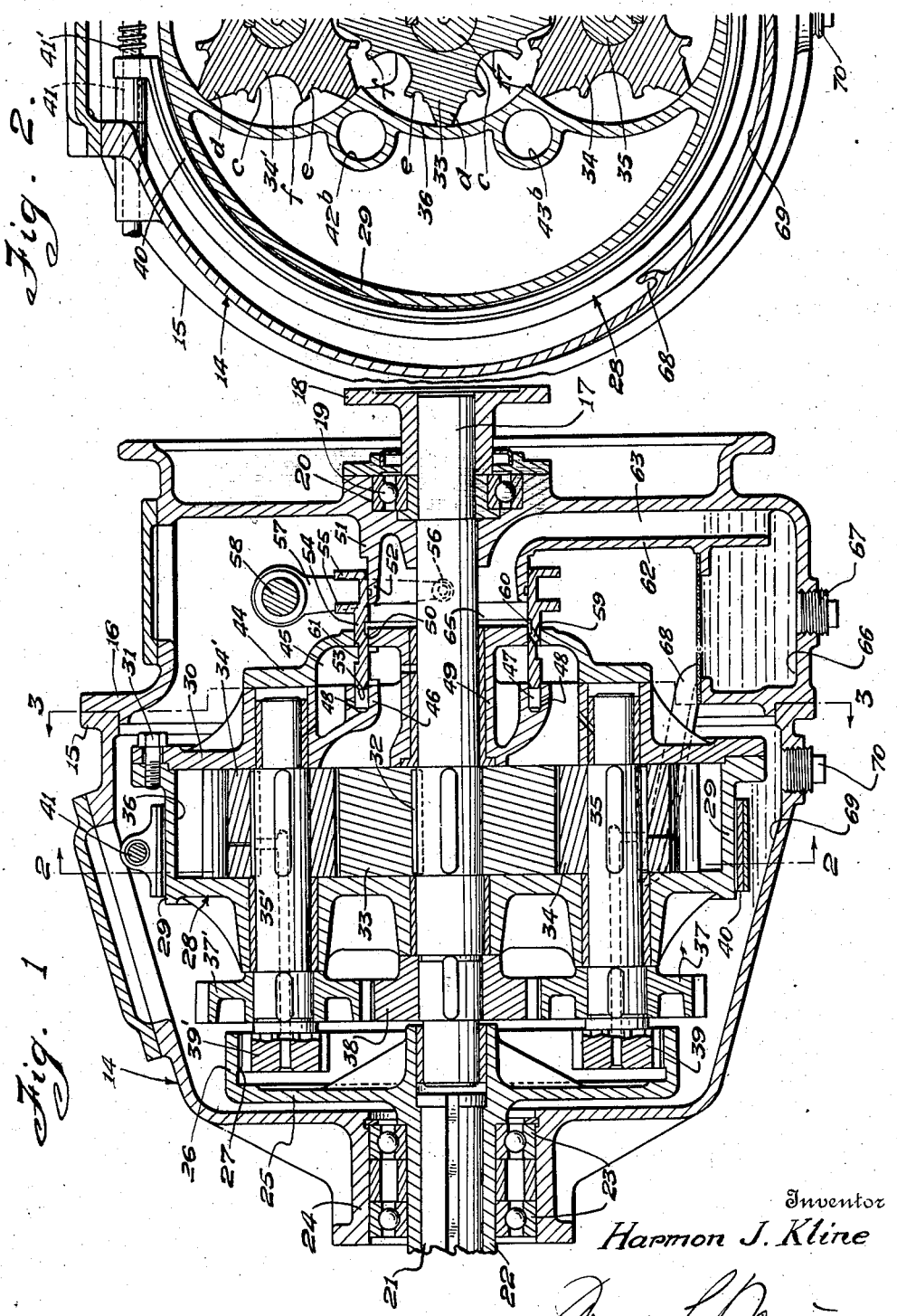
Inventor
Harmon J. Kline
By
Attorney April 22, 1930.                H. J. KLINE                 1,755,182
                      HYDRAULIC CLUTCH TRANSMISSION
                    Filed Aug. 14, 1928     5 Sheets-Sheet 2

Inventor
Harmon J. Kline
By
Attorney

Inventor
Harmon J. Kline
By
Attorney

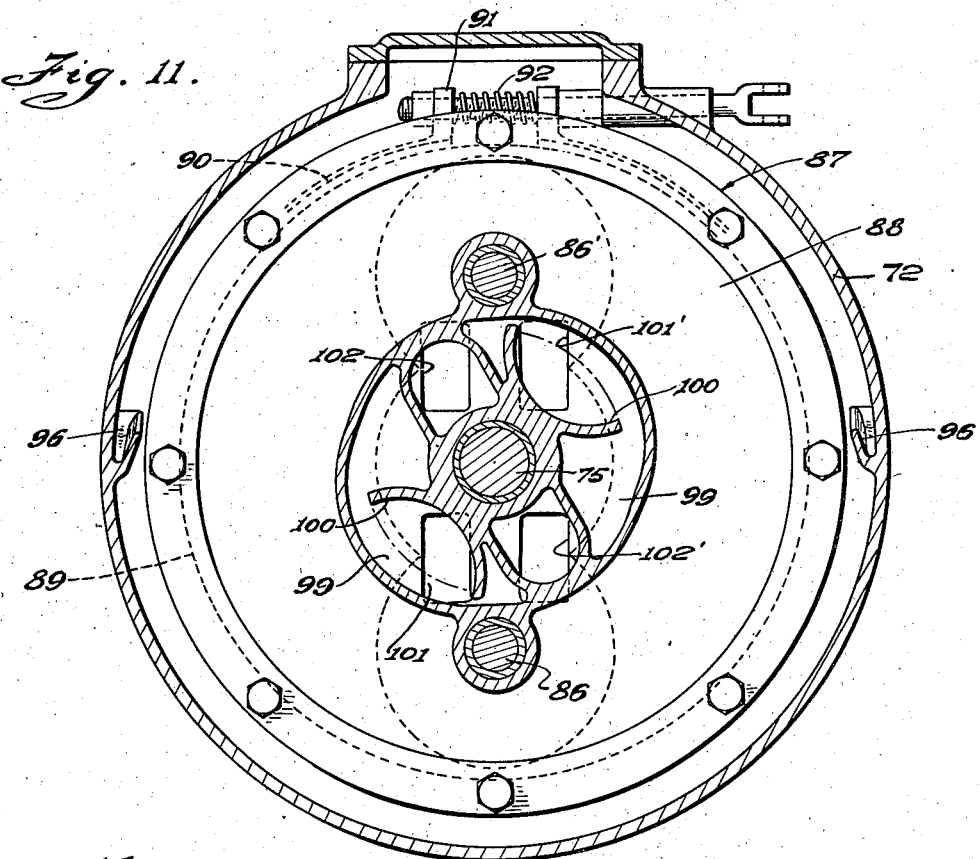
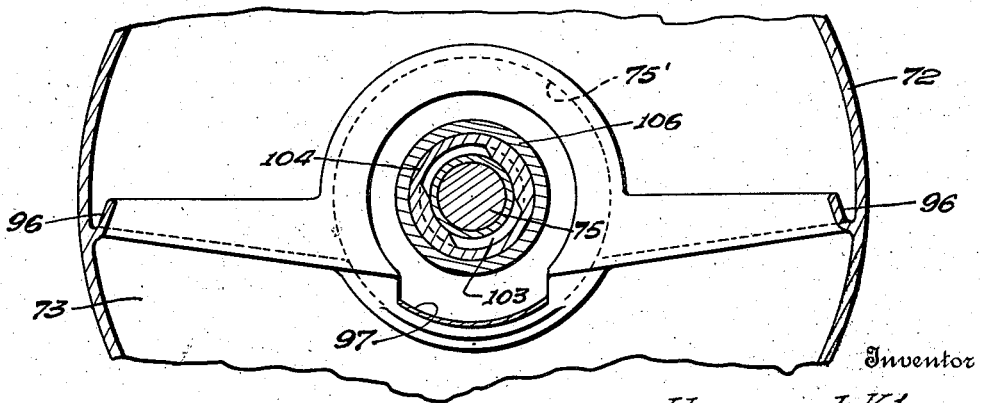

Patented Apr. 22, 1930

1,755,182

UNITED STATES PATENT OFFICE

HARMON J. KLINE, OF DETROIT, MICHIGAN

HYDRAULIC CLUTCH TRANSMISSION

Application filed August 14, 1928. Serial No. 299,461.

The present invention relates to improvements in hydraulic clutch transmissions, one object of the invention being the provision of a transmission of this type adapted to be interposed between a driving prime mover, such as an automobile engine, and the driven mechanism thereof such as the drive shaft and rear transmission and embodying means in which a liquid is employed as the transmitting medium between the driving element and the driven element, there being provided a novel arrangement for controlling the flow of liquid to regulate the transmission effect between the driving and driven element or the reversal in the direction of rotation of the driven element.

Another object of the invention is the provision of a hydraulic clutch transmission in which the liquid is adapted to be fed by gravity and suction to the rotor, the exhaust or intake of which is controlled manually by a valve so that the transmission effect of the liquid between the rotor and the casing thereof may be varied so that various speeds may be delivered from the driving to the driven element in a smooth and steady manner without necessity of employing gearing as in the present type of gear transmission.

Still another object of the present invention is the provision of a hydraulic clutch transmission of simple, practical and durable construction and one which can be readily interposed between the automobile engine and the drive shaft to dispense with the present clutch and gear transmission and to provide a means whereby various forward speeds may be obtained in a steady gradual manner and a single reverse speed may be obtained.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of the claims without departing from the spirit of the invention.

In the accompanying drawings:—

Fig. 1 is a longitudinal sectional view through the complete transmission;

Fig. 2 is a transverse sectional view on the line 2—2 of Fig. 1 of one-half of the present transmission;

Fig. 11 is a section taken on the line 11—11 of Fig. 10; and

Fig. 12 is a section taken on the line 12—12 of Fig. 10.

Figure 3:
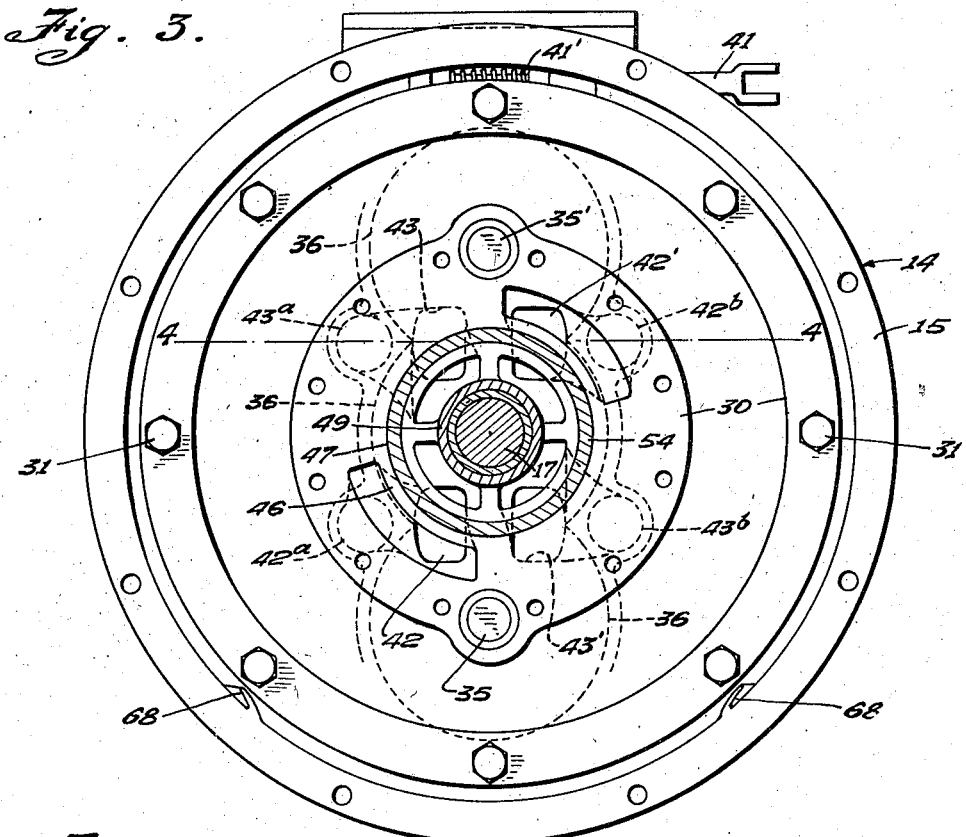
Fig. 3 is a section taken on the line 3—3 of Fig. 1.

Referring to the drawings and more particularly to Figs. 1 through 9, the numeral 14 represents a main casing which is a fixed stationary casing and is provided with the flange 15 for the attachment thereto of the forward end 16 of the casing. Mounted in the casing, which will later appear, is a driving shaft 17 which is provided with a coupling 18 for connection with the prime mover (not shown) preferably the engine of an automobile or motor car. The ball bearing 19 is mounted to anti-frictionally support the shaft in the portion 16 of the main casing and in the recess 20 while the driven shaft 21 is journalled in the rear end of the casing 14 and has attached thereto the sleeve 22 which is mounted in the two sets of anti-frictional bearings 23 supported in the sleeve 24 of the casing 14. The sleeve 22 is provided with the disk 25 which is rotatable therewith and as shown in Fig. 1 is provided with the rim 26 carrying the internal gear teeth 27 the purpose of which will presently appear.

The rotor casing 28 is mounted to rotate upon and with the shaft 17 and is provided with the brake drum or rim 29 the removable end 30 being attached by means of the bolts 31 so as to provide the rotor chamber 36. Attached to the shaft 17 by means of the key 32 and within the rotor casing is the main or center rotor 33 which in turn meshes with the cooperating rotors 34 and 34' keyed to and mounted upon the respective shafts 35 and 35'.

The rotors are formed, as shown in Fig. 2, with the intermeshing recesses $c$ and teeth $d$ and the smaller recesses $e$ and teeth $f$, this particular construction being of the type known as the rotor of the "Northern rotary pump", but may be of any desired shape that will effectively operate in the present transmission, it being the purpose of the present invention to utilize any type of rotor that will prove properly efficient. In order to drive the respective rotors, the gear 38 is keyed upon the shaft 17 exteriorly of the rotor casing 28 and drives the gears 37 and 37' cast with or keyed respectively to the shafts 35 and 35'. By this means the rotation of the shaft 17 through the gear 38 will rotate the two gears 37 and 37' and consequenly the two shafts 35 and 35' so that the rotors 33, 34 and 34' will be operated in proper time relation. Keyed to the respective shafts 35 and 35' are the gears 39 and 39' which mesh at diametrically opposite points with the gear 27 of the driving disk 25 thus providing means whereby the driven shaft 21 is rotated and in proper speed relation due to the speed of rotation of the rotor casing 28 driven through the rotors and the liquid as will presently appear under certain conditions, the gears 39 and 39' riding freely within the gear teeth 27 and other times imparting direct rotation thereto due to a fixed gripping action and the rotation of the rotor casing at the same speed as the shaft 17 or when the transmission is in "high".

In order to provide a means for locking or braking the rotor casing 28 and thus cause reverse motion to be transmitted to the shaft 21, a brake band 40 surrounds the brake drum 29 and is operated by means of the bolt or operating member 41 which is similar to the construction used in the band transmission of a well known motor car. The spring 41' normally holds the band loose while the rotation of the bolt 41 will cause the band to be contracted and grip the brake surface 29 and thus lock the rotor casing against rotation so that the rotors and the gears 38 and 37 and 37' will be caused to rotate and impart reverse rotation through the gear 27 to the shaft 21.

The rotor casing is provided in the present instance with two inlet ports 42 and 42' and two outlet ports 43 and 43' both of which lead into the chamber 45 of the casing 44 which seals one end of the rotor casing and is rotatable therewith. The annular portion 46 of the head 30 of the rotor casing adjacent the chamber 45 is provided with an annular slot 47 having the oil introduction ports 48, while mounted upon the shaft and forming a portion of the chamber 45 is a sleeve 49 which provides with the head 44 the annular opening 50 the purpose of which will presently appear.

Figure 4:
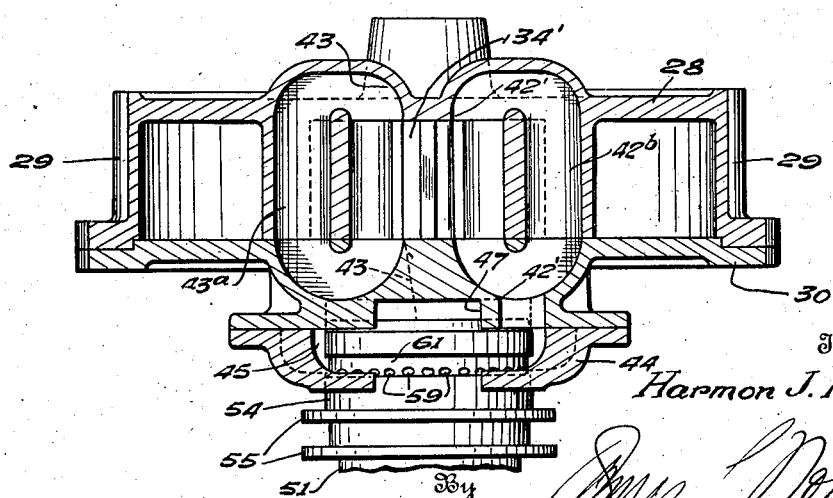
Fig. 4 is a section taken on the line 4—4 of Fig. 3.
Figure 5:
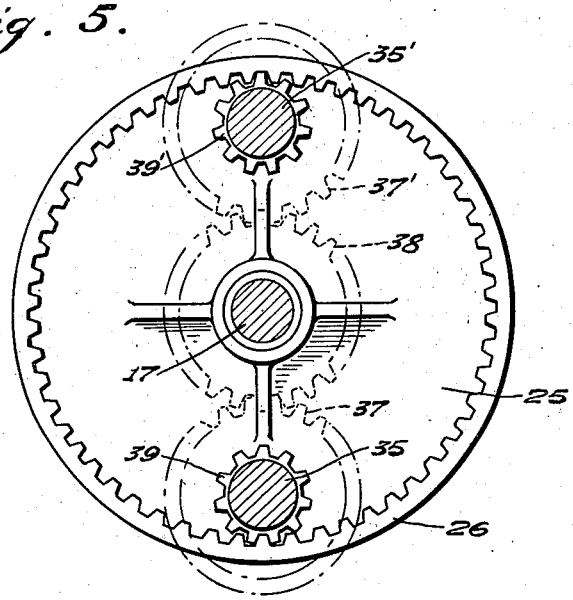
Fig. 5 is a detail plan view of the gearing between the driving and driven elements.

As shown in Fig. 4, the ports 42 and 42' are in communication respectively with the returns $42^a$ and $42^b$, while the ports 43 and 43' are in communication with the returns $43^a$ and $43^b$. By this arrangement, the oil is transferred to and from the rear side of the rotor teeth, and permits the clutch to idle freely, preventing noise of oil squeezing from between the teeth toward one end only.

Upon the inner center portion of the head 16 of the main casing there is formed a projection 51 having the annulus 52 integral therewith, the outer face of which alines with the outer edge of the member 49 and provides a guiding means for the rotatably mounted and slidable sleeve valve 54 which as shown normally projects through the annular opening 50 with its inner reduced end 53 workable in the annular slot 47 and forming a cut-off within the chamber 45 and also into the annular space 65 as will presently appear. This valve 54 is provided with the recess forming rings 55 at one end thereof to receive the pin roller 56 of the yoke 57 which yoke is operable with the shaft 58 exteriorly of the main casing and so as to cause the sleeve valve to be slid longitudinally of the main casing to regulate the amount of inlet and exhaust of the liquid used in the present transmission.

Figure 6:
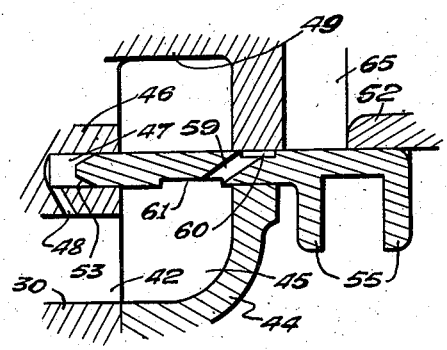
Fig. 6 is an enlarged detail sectional view through the rotor casing and one portion of the cylindrical valve.

The valve 54 as clearly shown in Figs. 1 and 6 is provided with a plurality of inclined ports 59 having the enlarged circumferential groove openings 60 and 61 at the respective ends thereof and which openings are of such a size as to permit of the gradual flow of the liquid from the chamber 65 into the outer portion of the chamber 45 and into the respective inlets 42 and 42' and to also permit the outlet of said liquid through the ports 43 and 43' into the opposite outer portion of the chamber 45 and through the respective ports 59 into the upper portion of the annular chamber 65 and thus complete a circuit of the liquid within the rotor to cause a differential transmission between the shaft 17, the rotor casing 28 and the gears 39 and 39' and 27 and the driven shaft 21. When the valve 51 is in its innermost position the liquid is sealed or held within the rotor chamber and as the same is non-compressible the rotor casing will be rotated at substantially the same speed as the driving shaft 17 and in consequence the driven shaft 21 will be directly connected to the drive shaft 17. The manipulation of the valve 54 to regulate the inlet and outlet flow of the liquid will produce a differential driving action to the shaft 17, the rotor casing and the driven shaft as will be fully understood.

The valve 54 is a balanced valve, thereby permitting the easy sliding of the same to regulate various speed transmissions even with a maximum pressure of 150 lbs. to the square inch equalized thereon.

Figure 7:
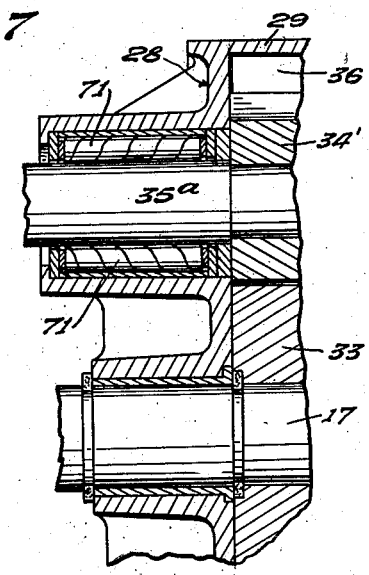
Fig. 7 is an enlarged sectional view showing the roller bearing mountings for the rotor shafts.

In order that liquid which is contained normally within the sump 69 sealed by the plug 70 of the main casing may be properly delivered to the rotor and the rotor will have a free exhaust of the liquid therefrom, the periphery of the rotor casing is dipped into the liquid within the sump and by centrifugal action causes the liquid to be spread upon the inner walls of the main casing from whence it drains or falls by gravity into the scuppers or troughs 68 which lead the same into screened supply tank 66 which is provided with the outlet plug 67. The tank 66 is in the nature of a settling basin for the liquid in which the liquid is retained sufficiently long to permit any air to escape from the liquid, as the presence of air in the internal liquid or oil system will result in useless work and would directly affect the slip, which must be avoided. This tank also allows some of the dirt and particularly the refuse from the reverse band 40 to settle out of the liquid, while the screen collects the larger particles. The suction pipe 62 which is formed integral with the head 16 provides a channel 63 the inlet of which is in the supply tank 66 and the outlet of which is through the annular space of the member 51 which leads to the annular space 65 before described. By this means the rotation of the rotor casing will cause the liquid to be delivered to the tank 66 from whence it is drawn by the action of the rotors 33, 34 and 34′ into the chamber and expelled therethrough as before described. Thus it will be seen that the liquid will have a free exhaust into the upper portion of the annular chamber 65 and will be drawn from said chamber into the inlet ports 42 and 42′, the valve 54 being so constructed and arranged as to regulate the flow and, therefore, the transmission effect between the driving shaft 17 and the driven shaft 21. As shown in Fig. 7 the shaft 35ª and, in fact, any desired shafts of the present construction is provided with the "Hyatt" roller bearings 71 which reduce the friction and maintain the desired tension between the rotor actuating shafts.

Figure 8:
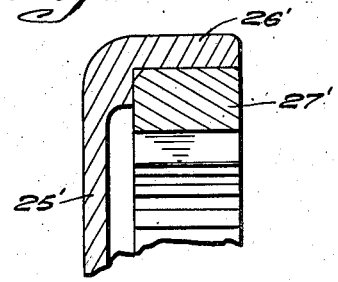
Figs. 8 and 9 are detail sectional views of two modified forms of internal gearing carried by the driven element.
Figure 9:
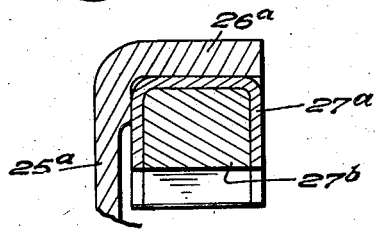

In Fig. 8 the disk 25′ is provided with a recessed rim 26′ for the reception of the steel gear 27′ which is forced by pressure into the same to fit tightly, while in Fig. 9 the disk 25ª is provided with the rim 26ª for the reception of the annular metal ring 27ª which provides a receptacle for the toothed rim or filling member 27ᵇ which is composed of a non-frictional material preferably "celoron" or "micarta."

Figure 10:
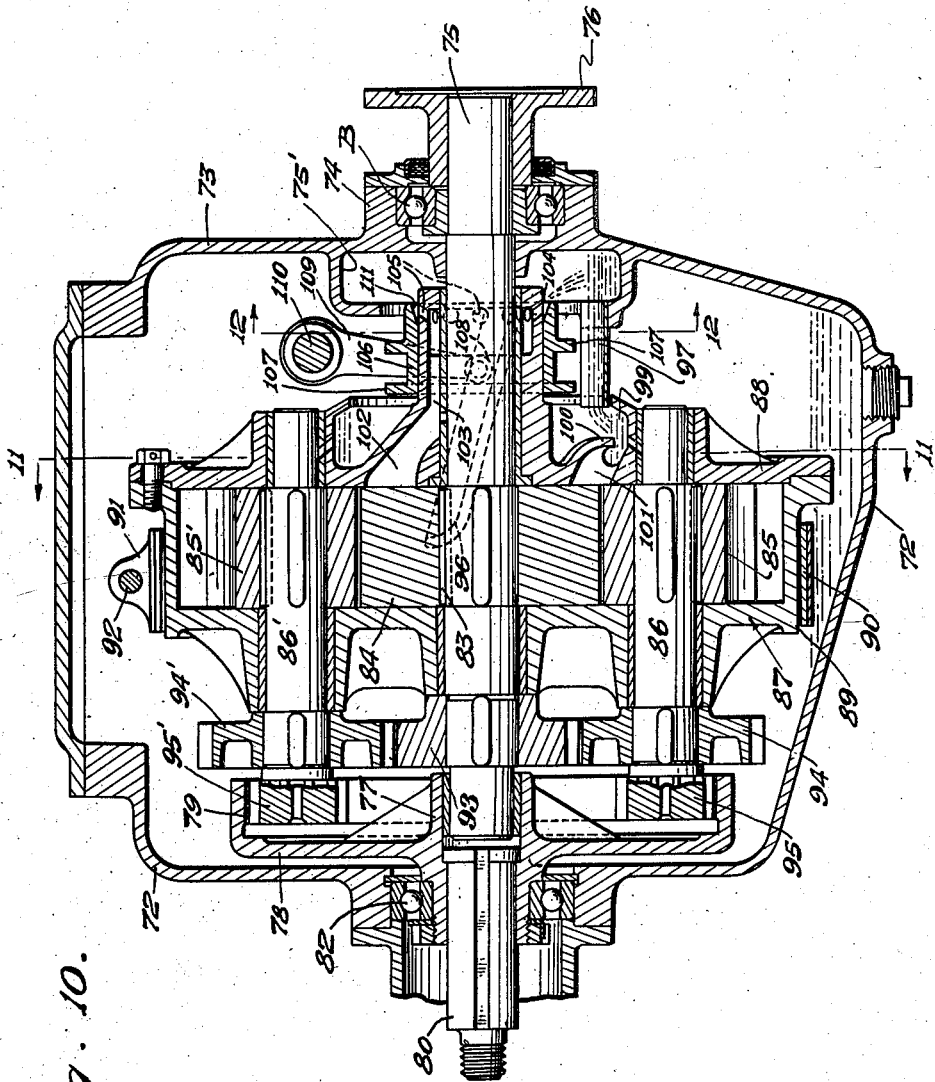
Fig. 10 is a longitudinal sectional view through a modified form of transmission.

In the construction shown in Figs. 10 to 12, the main casing 72 is provided with a head 73 in the boss 74 of which is mounted the ball bearing B and the main drive shaft 75 which is provided with the coupling 76 for attaching the same to the prime mover. Upon the inner face of the head 73 is provided an annular member 75′ which provides a receptacle for the liquid for supplying the same to the rotor, as will presently appear. The opposite end of the drive shaft 75 is mounted in the annular member 77 of the disk 78, which disk, as in the previously described construction, is provided with an internal gear 79 by means of which the driven shaft 80 is rotated, said shaft being mounted in the main casing upon the ball bearing 82. The key 83 connects the main rotor member 84 which is similar to the rotor construction heretofore described, and this rotor cooperates with the oppositely disposed rotors 85 and 85′ which, in turn, are carried by the respective shafts 86 and 86′ journalled in the rotor casing 87 which is sealed by means of the removable head 88.

This casing is provided with the brake drum 89 to receive the brake band 90 which is operated through the lugs 91 and the rod 92 similar to the band 40 heretofore described to provide the necessary reverse rotation from the shaft 75 to the shaft 80 while connected to the shaft 86 and 86′ are the gears 94 and 94′ which receive motion from the main gear 93 keyed upon the shaft 75. The gears 95 and 95′ are keyed to the respective shafts 86 and 86′ and mesh at diametrically opposite points with the internal gear 79 and thus form the transmitting means between the rotor casing and the shaft 80. The scuppers 96 are carried upon the internal walls of the main casing 72 and are adapted to receive the liquid thrown against the walls of the rotor casing and direct the same as clearly illustrated in Fig. 12 into the annular chamber 75′ from whence the liquid is fed through the channel or open tube 97 into the chamber 99 formed in the head 88 of the rotor casing. The oppositely disposed lips 100 project below the liquid level within the chamber 99 so that the liquid will be properly drawn by the action of the rotors through the respective inlet ports 101 and 101′ and through the respective outlets 102 and 102′ into the external annular chamber 103 which terminates in the projection 104 and out of the exhaust outlets 105 and thereby into the annular chamber 75'.

In order to control the amount of exhaust or outlet through the ports 105, the valve 106 is provided, this valve being of the cylindrical type and mounted for rotation with the rotor but having a longitudinal sliding movement upon the member 104, it being provided with the flanges 107 which provide a space for the reception of the roller pin 108 of the operating yoke 109, said yoke being rockable through the shaft 110 to impart the necessary longitudinal movement to the valve 106. The valve 106 as illustrated is provided with the inclined edge 111 adjacent the outer end thereof and which is adapted to form a means for directing the flow of the liquid from the ports 105 into the annular chamber 75' and to act as a gradual cut-off or a gradual releasing means for the flow of the liquid to provide the necessary and desired gradual transmission effect between the drive shaft 75 and the driven shaft 80.

In this construction the valve operates entirely as exhaust means whereas in the construction previously described the valve controls both the inlet and the exhaust of the liquid.

From the foregoing description taken in connection with the drawings it is evident that a hydraulic clutch made according to the present invention will take the place of the present type of clutch and gear transmission interposed between the engine and driving shaft of the automobile and provides an exceedingly elastic means for driving at various speeds from exceedingly low to direct; and also by the same construction with a brake means for locking or holding the rotor casing stationary a reverse rotation can be transmitted from the driving shaft to the driven shaft.

In order to increase the torque of the engine with a hydraulic transmission, there must be a gear reduction for "low" speed, and the best possible reduction is at least a 2 to 1, or 3 to 1. Therefore, there would be, for instance, forty-three teeth to the gear 37 and fifteen teeth for each pilot gear 39—39'. In practice, this might even be 4 to 1 or forty-three teeth to eleven teeth. The importance of this gear mounting and reduction cannot be too greatly stressed, as practically all hydraulic clutches as previously designed were merely slipping clutches that did not increase the torque of the engines and, therefore, had no advantage over the present type of slip clutch.

By making the gear 27 an internal gear, a quiet gear drive is obtainable.

I claim as my invention:—

1. A hydraulic clutch transmission, including a main casing, a driving and a driven shaft journalled therein, a rotor casing connected to and rotatable with or independently of the driving shaft, a main rotor connected to the driving shaft, a plurality of coacting rotors mounted in the casing, planetary gearing connecting the rotors to drive the driven shaft, said rotor casing being provided with inlet and outlet ports adjacent the center portion thereof, means carried by the main casing and cooperating with the rotor casing to supply liquid to the rotor casing and the rotors and means for controlling the flow of liquid through the rotor casing to regulate the transmisison effect from the driving to the driven shaft.

2. A hydraulic clutch transmission, including a main casing, a driving and a driven shaft journalled therein, a rotor casing connected to and rotatable with or independently of the driving shaft, a main rotor connected to the driving shaft, a plurality of coacting rotors mounted in the casing, planetary gearing connecting the rotors to drive the driven shaft, said rotor casing being provided with inlet and outlet ports adjacent the center portion thereof, means carried by the main casing and cooperating with the rotor casing to supply liquid to the rotor casing and the rotors and a cylindrical means forming a valve interposed between the liquid supply and the inlet and outlet ports of the rotor casing to control the speed of flow and consequently the transmission effect from the driving to the driven shaft.

3. A hydraulic clutch transmission, including a main casing, a driving and a driven shaft journalled therein, a rotor casing connected to and rotatable with or independently of the driving shaft, a main rotor connected to the driving shaft, a plurality of coacting rotors mounted in the casing, planetary gearing connecting the rotors to drive the driven shaft, said rotor casing being provided with inlet and outlet ports adjacent the center portion thereof, means carried by the main casing and cooperating with the rotor casing to supply liquid to the rotor casing and the rotors, a cylindrical valve revoluble with the rotor casing and interposed between the ports thereof and the supply, and manually operable means for sliding said valve to regulate the flow of the liquid to and through the rotor casing and to regulate the transmission effect between the driving and driven shafts.

4. A hydraulic clutch transmission, including a main casing, a driving and a driven shaft journalled therein, a rotor casing connected to and rotatable with or independently of the driving shaft, a main rotor connected to the driving shaft, a plurality of coacting rotors mounted in the casing, planetary gearing connecting the rotors to drive the driven shaft, said rotor casing being provided with inlet and outlet ports adjacent the center portion thereof, said main casing being provided with a liquid sump, scuppers carried by the main casing to receive the liquid from the walls of the casing and to direct the same to the inlet port of the rotor casing, and means for controlling the flow of fluid through the rotor to regulate the transmission effect from the driving to the driven shaft.

5. A hydraulic clutch transmission, including a main casing, a driving and a driven shaft journalled therein, a rotor casing connected to and rotatable with or independently of the driving shaft, a main rotor connected to the driving shaft, a plurality of coacting rotors mounted in the casing, planetary gearing connecting the rotors to drive the driven shaft, said rotor casing being provided with inlet and outlet ports adjacent the center portion thereof, and said main casing being provided with a liquid sump, scuppers carried by the main casing to receive the liquids from the walls thrown there by the centrifugal action of the rotor casing and for delivering the liquid to the inlet port of the rotor casing, and a cylindrical means forming a valve interposed between the liquid supply and the inlet port to control the speed of flow and consequently the transmission effect from the driving to the driven shaft.

6. A hydraulic clutch transmission, including a main casing, a driving and a driven shaft journalled therein, a rotor casing connected to and rotatable with or independently of the driving shaft, a main rotor connected to the driving shaft, a plurality of coacting rotors mounted in the casing, planetary gearing connecting the rotors to drive the driven shaft, said rotor casing being provided with inlet and outlet ports adjacent the center portion thereof, said main casing being provided with a liquid sump, scuppers carried by the main casing to receive the liquid from the walls of the casing deposited thereon by the centrifugal action of the rotor casing and for delivering the liquid to the inlet port of the motor casing, a cylindrical valve rotatable with the rotor casing and interposed between the ports thereof and the supply, and manually operable means for sliding the valve to regulate the flow of liquid to and through the rotor casing and to regulate the transmission effect between the driving and driven shafts.

7. A hydraulic clutch transmission, including a main casing, a driving and a driven shaft journalled therein, a rotor casing having inlet and outlet ports, a main rotor connected to the driving shaft and mounted in said casing, two co-acting rotors mounted in co-acting relation to the main rotor in said rotor casing, gearing between the driving shaft and both co-acting rotors whereby the rotors are operated simultaneously, cooperating driving means between the co-acting rotors and the driven shaft, and means for controlling the flow of liquid through the rotor casing, whereby the speed at which the rotor casing is rotated with the driving shaft is regulated and the speed of the driven shaft is regulated.

8. A hydraulic clutch transmission, including a main casing, a driving and a driven shaft journalled therein, a rotor casing having inlet and outlet ports, a main rotor connected to the driving shaft and mounted in said casing, two co-acting rotors mounted in co-acting relation to the main rotor in said rotor casing, gearing between the driving shaft and both co-acting rotors whereby the rotors are operated simultaneously, cooperating driving means between the co-acting rotors and the driven shaft, means for controlling the flow of liquid through the rotor casing, whereby the speed at which the rotor casing is rotated with the driving shaft is regulated and the speed of the driven shaft is regulated, and braking means for holding the rotor casing stationary while the driving shaft and rotor are operated to impart reverse rotation to the driven shaft.

9. A hydraulic clutch transmission, including a main stationary casing having a liquid sump, a driving shaft and a driven shaft journalled in said casing, a rotor casing mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft with the rotor casing, two co-acting rotors meshing with the main rotor and mounted in the rotor casing, gearing between the drive shaft and the auxiliary rotors to drive all rotors in timed relation, cooperating connecting means between the cooperating rotors and the driven shaft, and manually operable means for controlling and regulating the liquid flow from the receiving chamber to and through the rotor.

10. A hydraulic clutch transmission, including a main stationary casing having a liquid sump, a driving shaft and a driven shaft journalled in said casing, a rotor casing having a brake band mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft within the rotor casing, two co-acting rotors meshing with the main rotor and mounted in the rotor casing, gearing between the drive shaft and the auxiliary rotors to drive all rotors in timed relation, cooperating connecting means between the cooperating rotors and the driven shaft, manually operable means for controlling and regulating the liquid flow from the receiving chamber to and through the rotor, and a brake band for holding the rotor casing stationary while the drive shaft and rotors are being operated and to cause reverse action to be imparted to the driven shaft through the drive shaft and rotors.

11. A hydraulic clutch transmission, including a main stationary casing having a liquid sump, a driving shaft and a driven shaft journalled in said casing, a rotor casing mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft within the rotor casing, two co-acting rotors meshing with the main rotor and mounted in the rotor casing, gearing between the drive shaft and the auxiliary rotors to drive all rotors in timed relation, cooperating connecting means between the cooperating rotors and the driven shaft, and a slidably mounted cylindrical vave rotatable with the rotor casing and interposed between the receiving chamber and the inlet and outlet ports of the rotor casing to regulate the liquid flow to and from the rotors.

12. A hydraulic clutch transmission, including a main stationary casing having a liquid sump, a driving shaft and a driven shaft journalled in said casing, a rotor casing having a brake band mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft within the rotor casing, two co-acting rotors meshing with the main rotor and mounted in the rotor casing, gearing between the drive shaft and the auxiliary rotors to drive all rotors in timed relation, cooperating connecting means between the cooperating rotors and the driven shaft, a slidably mounted cylindrical valve rotatable with the rotor casing and interposed between the receiving chamber and the inlet and outlet ports of the rotor casing to regulate the liquid flow to and from the rotors, and a brake band for holding the rotor casing stationary while the drive shaft and rotors are being operated and to cause reverse rotation to be imparted through the drive shaft to the driven shaft by the rotors.

13. A hydraulic clutch transmission, including a main stationary casing having a liquid sump, a driving shaft and a driven shaft journalled in said casing, a rotor casing mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft within the rotor casing, two co-acting rotors meshing with the main rotor and mounted in the rotor casing, gearing between the drive shaft and the auxiliary rotors to drive all rotors in timed relation, cooperating connecting means between the cooperating rotors and the driven shaft, a slidably mounted cylindrical valve rotatable with the rotor casing and interposed between the receiving chamber and the inlet and outlet ports of the rotor casing to regulate the liquid flow to and from the rotors, and manually operable means for sliding the valve.

14. A hydraulic clutch transmission, including a main stationary casing having a liquid sump, a driving shaft and a driven shaft journalled in said casing, a rotor casing having a brake band mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft within the rotor casing, two co-acting rotors meshing with the main rotor and mounted in the rotor casing, gearing between the drive shaft and the auxiliary rotors to drive all rotors in timed relation, cooperating connecting means between the cooperating rotors and the driven shaft, a slidably mounted cylindrical valve rotatable with the rotor casing and interposed between the receiving chamber and the inlet and outlet of the rotor casing to regulate the liquid flow to and from the rotors, manually operable means for sliding the valve, and a brake band for holding the rotor casing stationary while the drive shaft and rotors are being operated and to cause reverse rotation to be imparted to the driven shaft through the drive shaft and rotors.

15. A hydraulic clutch transmission, including a main stationary casing having a liquid sump, a driving shaft and a driven shaft journaled in said casing, a rotor casing mounted in the main casing and disposed to rotate in the sump to throw the liquid therefrom upon the walls of the main casing, said rotor casing having inlet and outlet ports, a liquid receiving chamber connected with the ports of the rotor casing and to receive the liquid from the walls of the main casing, a main rotor mounted upon the drive shaft within the rotor casing, two coacting rotors meshing with the main rotor and mounted in the rotor casing, gearing between the drive shaft and the auxiliary rotors to drive all rotors in timed relation, cooperating connecting means between the cooperating rotors and the driven shaft, and a valve interposed between the receiving chamber and the inlet and outlet ports of the rotor casing to regulate the liquid flow to and from the rotors.

In testimony whereof I have hereunto set my hand.

HARMON J. KLINE.